Figure 1:
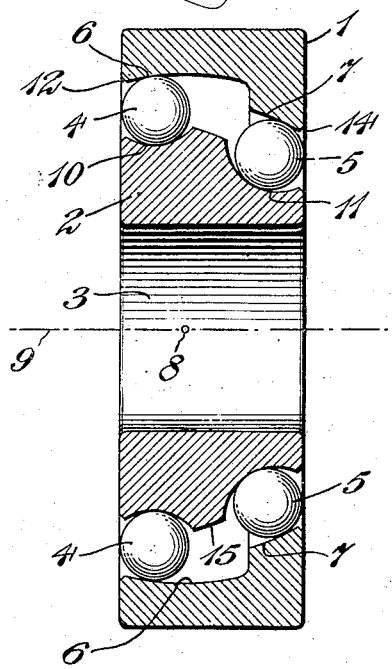

S. G. WINGQUIST.
BEARING.
APPLICATION FILED MAR. 21, 1912.

1,150,844.

Patented Aug. 17, 1915.
2 SHEETS—SHEET 1.

WITNESSES:
A. C. Abbott
W. E. Lawson

INVENTOR
Sven Gustaf Wingquist
By
Attorney

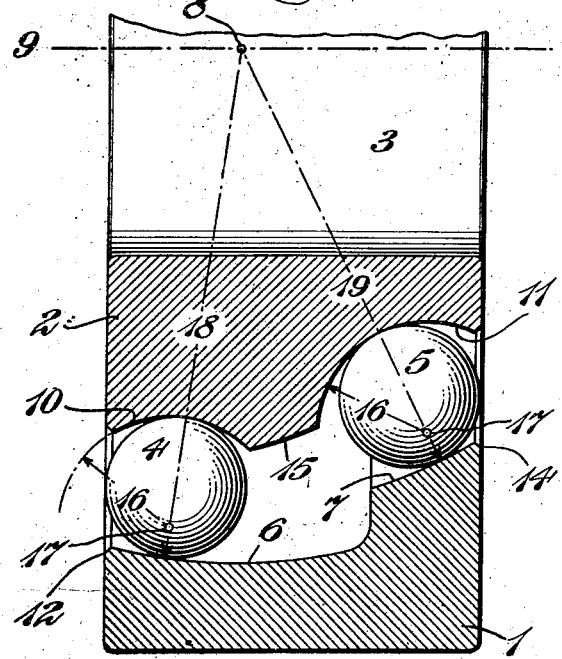

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BEARING.

1,150,844.

Specification of Letters Patent.  Patented Aug. 17, 1915.

Application filed March 21, 1912.  Serial No. 685,229.

*To all whom it may concern:*

Be it known that I, SVEN GUSTAF WINGQUIST, a subject of the King of Sweden, and a resident of Gottenborg, Sweden, have invented certain Improvements in Bearings, of which the following is a specification.

This invention relates to ball bearings and particularly to a bearing which will support the radial load and the axial thrust, which is self-adjusting and self-contained, and wherein the balls may be removed from their races by merely tilting one member of the bearing relatively to the other.

The illustrated form of the invention comprises a combined radial and thrust bearing having an inner and an outer ring or bearing member, the inner bearing member having two grooves forming unbroken and integrally connected tracks of unequal radius from the axis of rotation of the bearing, this pair of circular concave running faces with which such member is provided are shown struck from centers on the rotative axis of such member and having unequal radii from said axis. A pair of ball sets is mounted on said faces, that is a ball set is mounted on each track. The outer member or ring is shown having hollow spherical unbroken and integrally connected tracks for the balls constituting a pair of integral, concave, outer spherical running faces with which the balls contact. Such faces are struck with unequal radius from a center point positioned on the axis of rotation of the bearing within the bearing and nearer the plane of one ball set than that of the other, said point being also located on the axis of the inner member and nearer to the center of the larger running face, or that having of the greater radius, than to that of the smaller running face, or that having the smaller radius. By this construction the ball sets resist predetermined unequal pressures along radial lines passing through each track and said sphere center, and the inner member and the balls are capable of a tilting movement around such center point for bringing the balls outside the outer member.

This invention is in the nature of an improvement upon the bearing set forth and claimed in my co-pending application Serial No. 695,681, filed May 7, 1912 as a division of my co-pending application Serial No. 390,416, filed August 28, 1907. In my application Serial No. 695,681 a bearing is shown wherein the outer member is provided with an inner spherical face having a plurality of ball tracks upon it, the center of such spherical face being located within the bearing on the axis of rotation of the bearing, and in the form claimed specifically therein the spherical track portions are of equal radius from said oscillatory center. In the present improvement however, the portion of the track upon the spherical face for receiving the axial thrust is at a less radius from the sphere center than is the track for receiving and supporting the radial load.

In some instances it is found desirable to employ a bearing wherein a very oblique direction of pressure is applied to one set of balls in the bearing of my application Serial No. 691,681 for resisting the end thrust. Such oblique direction however is accompanied by the necessary corresponding increase of the width of the bearing. The advantage gained by using spherical tracks of unequal radii from the common center resides in the fact that a sufficient oblique direction of pressure may be applied to one ball set without increasing the width of the bearing. One of the objects of the invention therefore being that a bearing for given magnitudes of the angles of pressure for both ball sets may be provided in a narrow bearing.

Figure 2:
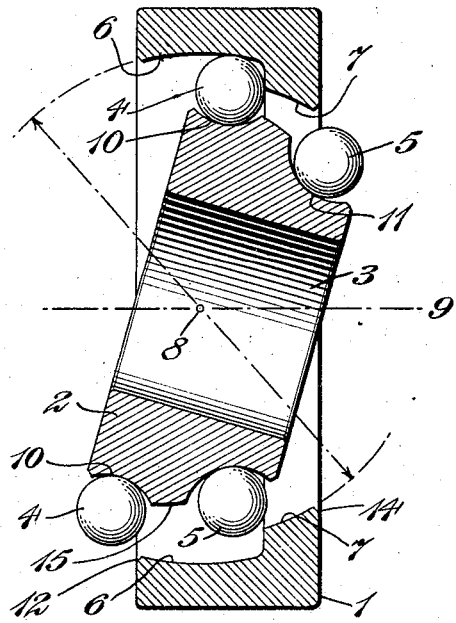
Figure 3:
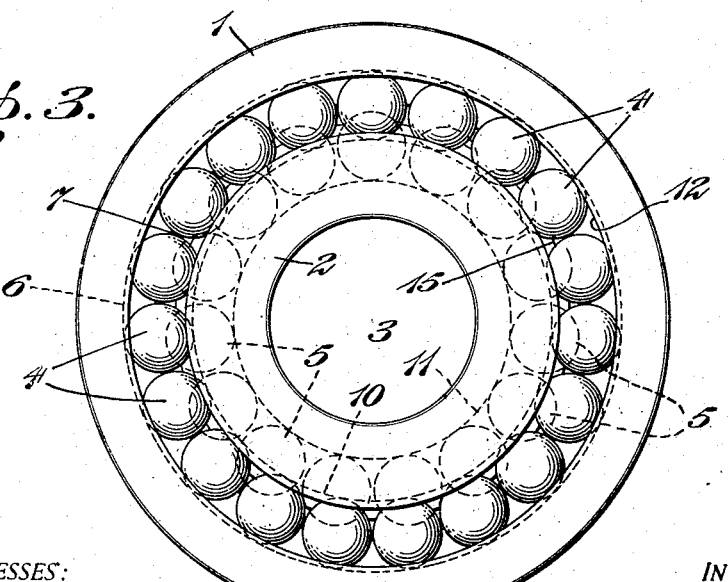

In the drawings accompanying this specification, Figure 1 is a central sectional view upon an axial plane; Fig. 2 is a view sin 'ar to Fig. 1 but showing the members turn. 1 or oscillated one relatively to the other to facilitate the insertion, removal or inspection of the balls. Fig. 3 is an end or face view, and Fig. 4 is an enlarged view of the lower portion of the bearing illustrated in Fig. 1.

The improved bearing shown in these views is provided with an outer ring or member 1, and an inner ring or member 2, centrally apertured as indicated at 3 to receive a shaft or other rotatory part to be supported, these rings or members being herein represented as formed each from an integral piece of metal so as to be uniformly strong throughout, and to afford unbroken integrally connected track faces and being of such dimensions as to afford between them, when in assembled relation, an annular space or chamber adapted to receive balls in a plurality of annular sets or series.

The interior of the outer ring or member 1 is shown provided with circular tracks 6 and 7 extended around it adjacent its opposite ends, whereon the two annular sets or series 4 and 5 of balls are adapted to contact and travel during the use of the improved bearing, and these tracks 6 and 7 are herein shown formed as parti-spherical concave bearing surfaces which are struck from a common center, indicated at 8. The bearing, it will be seen, is not symmetrical on both sides of a plane perpendicular to the axis of rotation of the bearing at point 8, the bearing being somewhat extended at one end, the right-hand end. The said point 8 must, however, be located within the bearing on the center line 9 or axis of rotation.

As in the device shown and claimed in my co-pending patent application, Serial No. 390,416, filed August 28, 1907, the inner ring or member 2 is provided in its perimetral surface with spaced annular grooves or tracks 10 and 11, adjacent its opposite ends, and adapted to receive the balls of the respective sets or series 4 and 5, and to hold them accurately in relation to the surfaces 6 and 7.

The point 8, hereinafter referred to as the oscillatory center, is positioned on the axis 9 in a plane passing through the outer ring 1 at one side of the center thereof, whereby those portions 12 and 14 of the bearing surfaces 6 and 7 which are adjacent to the sides of the member 1 are nearest to the rotative axis 9, and afford annular inwardly directed flanges within which the ball series 4 and 5 are confined securely when the parts are assembled, and the portion 15 of the inner ring also affords shoulders which are adapted to maintain the balls in place, so that shifting of the members relatively one to the other in an axial direction is effectively prevented.

The perimetral grooves or tracks 10 and 11 of the inner ring or member are rounded in cross section so that their concave surfaces, as indicated in Fig. 4, conform to curves struck with radii 16 slightly greater than those of the balls of the respective sets or series 4 and 5, from centers 17 positioned on lines extended at angles to each other from the center 8 of oscillatory movement of the bearing through the centers of the balls of the respective sets or series, as indicated at 18 and 19 in said figure. In this way each ball in each of the sets or series 4 and 5 will have contact upon the rings or members 1 and 2 at only two points diametrically opposite each other and alined on the lines 18 and 19 passing through the center 8 and through the center of such ball in such a manner that friction and wear are substantially eliminated and the balls are caused to travel with a true rolling movement.

By this construction and arrangement stress is not applied to the outer ring or member in directions perpendicular to the rotative axis 9, but in the directions of the lines 18 and 19, and by reason of the positioning of the respective ball sets or series 4 and 5 in planes perpendicular to the rotative axis 9 at opposite sides of the center 8 and at different distances therefrom, and the resultant unequal angularity of the lines 18 and 19, diverging from said center, with respect to such perpendicular planes, it will be apparent that the stress imposed upon the respective ball sets or series is unequal in proportion to the inequality of the angles made by said lines 18 and 19 with a perpendicular from the rotative axis.

In the embodiment of my invention shown herein the direction in which stress is applied to the ball set or series 5 is at a greater angle to a perpendicular from the rotative axis 9 than the direction in which stress is applied to the ball set or series 4, and in proportion to the inequality of these angles, less stress will be imposed upon the ball set or series 5 than upon the ball set or series 4, and in the structure shown in Figs. 1 to 4 I have taken advantage of the difference in stress imposed upon the respective ball sets or series to simplify the device and render the same less costly by reducing the number of balls comprised in the series or set 5, since fewer balls are required to withstand the stress imposed upon that set or series than are requisite in the set or series 4 to withstand the stress imposed thereupon. In accomplishing this result I have also produced the parti-spherical track or bearing surface 7 of the outer ring or member at a less distance from the oscillatory center 8 than the track or bearing surface 6, and have correspondingly modified the track or bearing surface 11, so as to attain an arrangement of the balls in said set or series 5 in such close proximity as is best adapted to insure its action complementally to the set or series 4 in receiving and transmitting the stress imposed upon the parts of the device during use.

The members of the improved bearing herein shown are securely held in relation by the interposed balls when the parts are assembled, and are also adapted to be conveniently and quickly separated upon simply tilting one member relatively to the other about the point 8, this movement serving, as indicated in Fig. 2, automatically to withdraw the balls of the respective series 4 and 5 from between the inner and outer members so that they may be inspected, removed or replaced at will, while at the same time a certain extent of gyratory movement of one member relatively to the other about such center of oscillation 8 is permitted during the use of the bearing and is useful in overcoming defects in alinement or the like. Furthermore, by reason of the positioning of the oscillatory center 8 of the bearing nearer to one side of the device than to the other, one of the inwardly directed lateral flanges 14, is caused to extend nearer the rotative axis 9 than its companion flange or projection 12, and since at the same time the directions in which stress is transmitted through the balls of the set or series 5 present greater angularity with respect to a perpendicular from the rotative axis than the directions in which stress is transmitted through the balls of the companion set or series 4, it will be understood that the side of the bearing whereat the ball set or series 5 is situated is particularly well adapted to withstand end thrust. This increased capacity of the device for withstanding end thrust is also augmented by the positioning of the parti-spherical track or bearing surface 7 nearer to the oscillatory center 8 than its companion track or bearing surface 6.

From the above description it will be evident that the improved ball bearing constructed according to my invention is of an extremely simple and comparatively inexpensive nature and is particularly well adapted for use by reason of the facility with which it may be assembled and taken apart without requiring any special or peculiar skill upon the part of the operator, and of its capacity for resisting end thrust, and it will also be obvious from the above description of my improvements that the device is susceptible of considerable modification without material departure from the principles and spirit of the invention and for this reason I do not desire to be understood as limiting myself to the precise formation and arrangement of the several parts herein set forth in carrying out my invention in practice.

The improvement illustrated herein of a combined radial and thrust bearing comprising an inner and an outer bearing member, each of these being formed with two tracks radiating from a common oscillatory center, and of unequal radius from the axis of rotation of the bearing is claimed in my said co-pending application Serial No. 695,681; this invention being specific to said application, but in so far as the tracks on the inner surface of the outer member are of unequal radius from the common center, this invention is an improvement upon the invention claimed in such application.

Having thus described my invention, what I claim and desire to secure by Letters Patent is—

1. A device of the character described having relatively rotatable members one of which is capable of oscillatory movement relatively to the other about a center positioned in the rotative axis of the rotatable member, and a plurality of ball sets interposed between the members at different distances from the oscillatory center and adapted to transmit transverse stress in directions radiating from said oscillatory center at unequal angles to a perpendicular from the rotative axis, the ball set which transmits such transverse stress at the greater angle to said perpendicular being at the less distance from the oscillatory center and being adapted to transmit less transverse stress, to resist greater end thrust, and comprising fewer balls than its companion ball set.

2. A device of the character described having inner and outer relatively rotatable members and two ball sets, one of which members is capable of oscillatory movement about a center positioned in the rotative axis of the rotatable member at a point at one side of the plane centrally disposed between the ball sets, the outer member having parti-spherical bearing surfaces adjacent its opposite sides struck from said oscillatory center at different distances therefrom, the ball sets being interposed between said members and contacting with the respective parti-spherical bearing surfaces of said outer member, the inner member having a central portion whose opposite sides are adapted to retain the respective ball sets pressed upon the parti-spherical bearing surfaces of the outer member, and said ball sets being at different radial distances from said oscillatory center and being adapted to transmit transverse stress in directions radiating from said oscillatory center at unequal angles to a perpendicular from said rotative axis.

3. A combined radial and thrust bearing comprising an inner and an outer bearing member, the inner bearing member having two grooves forming unbroken tracks of unequal radii from the axis of rotation of the bearing, a ball set mounted on each track, and the outer member having hollow spherical unbroken tracks for said balls struck with unequal radii from a center point positioned on the said axis within the bearing, the said inner member and the ball sets being capable of a tilting movement around the said center point to bring the balls outside the outer member.

4. A combined radial and thrust bearing comprising an inner and an outer bearing member, the inner bearing member having two grooves forming unbroken tracks of unequal radii from the axis of rotation of the bearing, a ball set mounted on each track, and the outer member having hollow spherical unbroken tracks for said balls struck with unequal radii from a center point positioned on the said axis within the bearing and nearer the plane of one ball set than that of the other, the said inner member and the ball sets being capable of a tilting movement around the said center point to bring the balls outside the outer member.

5. A combined radial and thrust bearing comprising an inner and an outer bearing member, the inner bearing member having two grooves forming unbroken and integrally connected tracks of unequal radii from the axis of rotation of the bearing, a ball set mounted on each track, and the outer member having hollow spherical unbroken tracks for said balls struck with unequal radii from a center point positioned on the said axis within the bearing and nearer the plane of one ball set than that of the other, the said inner member and the balls being capable of a tilting movement around the said center point to bring the balls outside the outer member.

6. A combined radial and thrust bearing comprising an inner and an outer bearing member, the inner bearing member having two grooves forming unbroken tracks of unequal radii from the axis of rotation of the bearing, a ball set mounted on each track, and the outer member having hollow spherical unbroken and integrally connected tracks for said balls struck with unequal radii from a center point positioned on the said axis within the bearing and nearer the plane of one ball set than that of the other, the said inner member and the ball sets being capable of a tilting movement around the said center point to bring the balls outside the outer member.

7. A combined radial and thrust bearing comprising an inner and an outer bearing member, the inner bearing member having two grooves forming unbroken and integrally connected tracks of unequal radii from the axis of rotation of the bearing, a ball set mounted on each track, and the outer member having hollow spherical unbroken and integrally connected tracks for said balls struck with unequal radii from a center point positioned on the said axis within the bearing and nearer the plane of one ball set than that of the other, the said inner member and the balls being capable of a tilting movement around the said center point to bring the balls outside the outer member.

8. In a ball bearing the combination of an inner bearing member provided with a pair of circular concave running faces struck from centers on the rotative axis of said member and having unequal radii from said axis, a pair of ball sets located on said faces, and a pair of integral, concave, outer spherical running faces, with which said ball sets contact, struck with unequal radii from a point also located on said axis but nearer to the center of the larger running face than to that of the smaller running face, whereby the respective ball sets may resist predetermined unequal pressures along radial lines passing through said point and said circular running faces.

9. In a ball bearing the combination of an inner bearing member provided with a pair of concave circular unbroken tracks struck with unequal radii from centers located on the axis of rotation of said member, a ball set located on each of said tracks, and an outer ring having a pair of concave, integral, spherical running faces with which said ball sets contact, said faces struck with unequal radii from an oscillating center also located on said axis, but nearer the center of the running face having the greater radius than to that of the running face having the smaller radius, whereby said ball sets may resist unequal predetermined pressures along lines passing through each track and said oscillating center, and whereby said inner member and ball sets will be capable of a tilting movement around said oscillating center.

In witness whereof I have hereunto signed my name in the presence of two subscribing witnesses.

SVEN GUSTAF WINGQUIST.

Witnesses:
W. E. LAWSON,
J. D. CAPLINGER.

Copies of this patent may be obtained or five cents each, by addressing the "Commissioner of Patents, Washington, D. C."